(12) United States Patent
Bae et al.

(10) Patent No.: US 7,123,437 B2
(45) Date of Patent: Oct. 17, 2006

(54) RECORDING APPARATUS ENABLING REPLACEMENT OF DISK CARTRIDGE

(75) Inventors: Byoung-young Bae, Pyoungtag (KR); Soon-kyo Hong, Seoul (KR); Chul-woo Lee, Sungnam (KR); Young-min Cheong, Seoul (KR); Cheol-sung Yeon, Suwon (KR); Seung-tae Jung, Sungnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 09/962,313

(22) Filed: Sep. 26, 2001

(65) Prior Publication Data

US 2002/0039250 A1 Apr. 4, 2002

(30) Foreign Application Priority Data

Oct. 2, 2000 (KR) ................................ 2000-57989

(51) Int. Cl.
*G11B 17/02* (2006.01)

(52) U.S. Cl. .................................................. 360/97.01
(58) Field of Classification Search ............. 360/97.01, 360/99.02, 99.06, 97.02, 97.04
See application file for complete search history.

(56) References Cited

U.S. PATENT DOCUMENTS 4,750,063 A * 6/1988 Kume et al. ............. 360/99.02
6,452,741 B1 * 9/2002 Mukaijima et al. ...... 360/99.06

* cited by examiner

*Primary Examiner*—Robert S. Tupper
(74) *Attorney, Agent, or Firm*—Stein, McEwen & Bui, LLP

(57) ABSTRACT

A PCMCIA card type recording apparatus includes a housing having a seating section on which a disk cartridge is seated, a disk driving section disposed in the housing to rotatably drive a recording medium in the disk cartridge seated on the seating section, a recording/reproducing unit disposed in the housing to record and reproduce data with respect to the recording medium, and a protection cover disposed at the housing to cover and protect the disk cartridge.

38 Claims, 7 Drawing Sheets

RECORDING APPARATUS ENABLING REPLACEMENT OF DISK CARTRIDGE

CROSS-REFERENCE TO RELATED APPLICATIONS

This application claims the benefit of Korean Application No. 2000-57989, filed Oct. 2, 2000, in the Korean Industrial Property Office, the disclosure of which is incorporated herein by reference.

BACKGROUND OF THE INVENTION

1. Field of the Invention

The present invention relates to a PCMCIA card type recording apparatus, and more particularly, to a recording apparatus to transmit and receive data through a PCMCIA port and to allow replacement of a disk cartridge on which the data is recorded.

2. Description of the Related Art

A recording apparatus to record and reproduce data on and from a disk type recording medium has been developed in various ways. Examples of such recording apparatuses include a floppy disk drive (FDD), a hard disk drive (HDD), and the like. The FDD records and reproduces, magnetically, data on and from a magnetic disk held in a case. The HDD rotates a hard disk mounted in a case at a high speed to magnetically record and reproduce the data.

Compared with the FDD, the HDD has a superior performance in view of a data transmission speed and a memory capacity, and is used as a main memory unit of a computer. However, unlike the FDD, which is easily carried and mounted in computers, the HDD has shortcomings in that it occupies a large volume, and lacks portability. Due to this, most computers have both the HDD and FDD.

In addition to the portable laptop computer, other compact and portable machines such as a camcorder, a digital camera, a game machine, a personal data assistant, and the like have been developed and come into wide use. Accordingly, there has been a growing demand for a recording apparatus to be used in the above-described machines to record and reproduce the data, and which is compact.

However, since the above-described machines have a small inner space, the FDD and the HDD cannot both be used in the portable machines. Accordingly, the portable machines include a separate FDD, which has to be always carried. The separate FDD is generally cumbersome. Accordingly, a PCMCIA card type recording apparatus, which transmits and receives data with a product such as a computer or the like through a PCMCIA port, is used in the product instead of the FDD.

A conventional PCMCIA card type recording apparatus comprises a removable housing that is connected through a PCMCIA port of a product such as a computer or the like, a disk type recording medium held in the housing, a head and a head arm to record or reproduce the data on or from the disk type recording medium, a head driving mechanism to drive the head and the head arm, and a control circuit board. The PCMCIA card type recording apparatus can be used as the FDD or the HDD according to the kind of the disk type recording medium held therein.

However, the conventional PCMCIA card type recording apparatus has the recording medium fixed in the housing. Accordingly, if a memory capacity is running short and an additional capacity is required, the PCMCIA card type recording apparatus itself has to be replaced. The replacement of the PCMCIA card type recording apparatus causes problems in increased cost for replacement and in having to prepare a certain space to keep the replaced recording apparatus.

SUMMARY OF THE INVENTION

In order to solve the above and other problems, an object of the present invention is to provide a PCMCIA card type recording apparatus enabling replacement of a disk cartridge holding a disk when requiring an additional memory capacity, thereby reducing a cost for the replacement of the disk cartridge and allowing the convenience of the keeping and using the disk cartridge.

Additional objects and advantages of the invention will be set forth in part in the description which follows and, in part, will be obvious from the description, or may be learned by practice of the invention.

In order to accomplish the above and other objects, a PCMCIA card type recording apparatus according to an embodiment of the present invention includes a housing having a seating section on which a disk cartridge is seated, a disk driving section disposed in the housing to rotatably drive a recording medium in the disk cartridge seated on the seating section, a recording/reproducing unit disposed in the housing to record and reproduce data with respect to the recording medium, and a protection cover disposed at the housing to cover and protect the disk cartridge.

According to an aspect of the present invention, the protection cover is removably disposed at the housing.

According to another aspect of the present invention, the protection cover is pivotably disposed at the housing.

According to yet another aspect of the present invention, the recording apparatus further comprises a removal preventing mechanism to prevent the protection cover, which is connected to the housing, from being removed from the housing, where the removal preventing mechanism includes a plurality of elastic pieces formed on the protection cover and/or the housing and a plurality of snap protrusions formed on the protection cover and/or the housing to correspond to the elastic pieces.

According to still another aspect of the present invention, the elastic pieces are formed by being cut in a horizontal direction or a vertical direction according to a relative connection direction of the disk cartridge to the protection cover.

According to a further aspect of the present invention, the recording apparatus further comprises a movement preventing mechanism to prevent the disk cartridge seated on the seating section from moving, where the movement preventing mechanism includes a portion that defines a plurality of holes formed on the disk cartridge and a plurality of elastic protrusions protruded from the seating section to correspond to the holes and deformed elastically to be inserted into the holes.

According to a yet further aspect of the present invention, the movement preventing mechanism includes at least one protrusion protruded from an outer surface of the disk cartridge and at least one elastic piece formed on a sidewall of the protection cover to be in contact with the protrusion elastically.

According to a still further aspect of the present invention, the movement preventing mechanism includes at least one magnet disposed on a bottom of the seating section to be connected to a case of the disk cartridge by a magnetic force, where the case is made of metal.

According to a yet still further aspect of the present invention, the recording apparatus further includes a position determining mechanism to determine a position of the seating section on which the disk cartridge is seated, where the position determining mechanism includes at least one protrusion protruded from the seating section of the housing body and a portion defining a hole formed on the disk cartridge to correspond to the protrusion, and where the position determining mechanism includes a stepped portion, formed at the seating section of the housing body, that is in contact with an edge of the disk cartridge such that the seating position of the disk cartridge is determined.

According to an additional aspect of the present invention, the protection cover is in a shape of a case having a receiver to hold the disk cartridge such that the protection cover is seated on the seating section with the disk cartridge held therein.

According to still another aspect of the present invention, the protection cover has an open side and an open bottom such that the disk cartridge is connected to the protection cover in a horizontal direction.

BRIEF DESCRIPTION OF THE DRAWINGS

The above and other objects and characteristics of the present invention will become more apparent and more readily appreciated by describing in detail preferred embodiments thereof with reference to the accompanying drawings, in which.

DETAILED DESCRIPTION OF THE PREFERRED EMBODIMENTS

Figure 1:
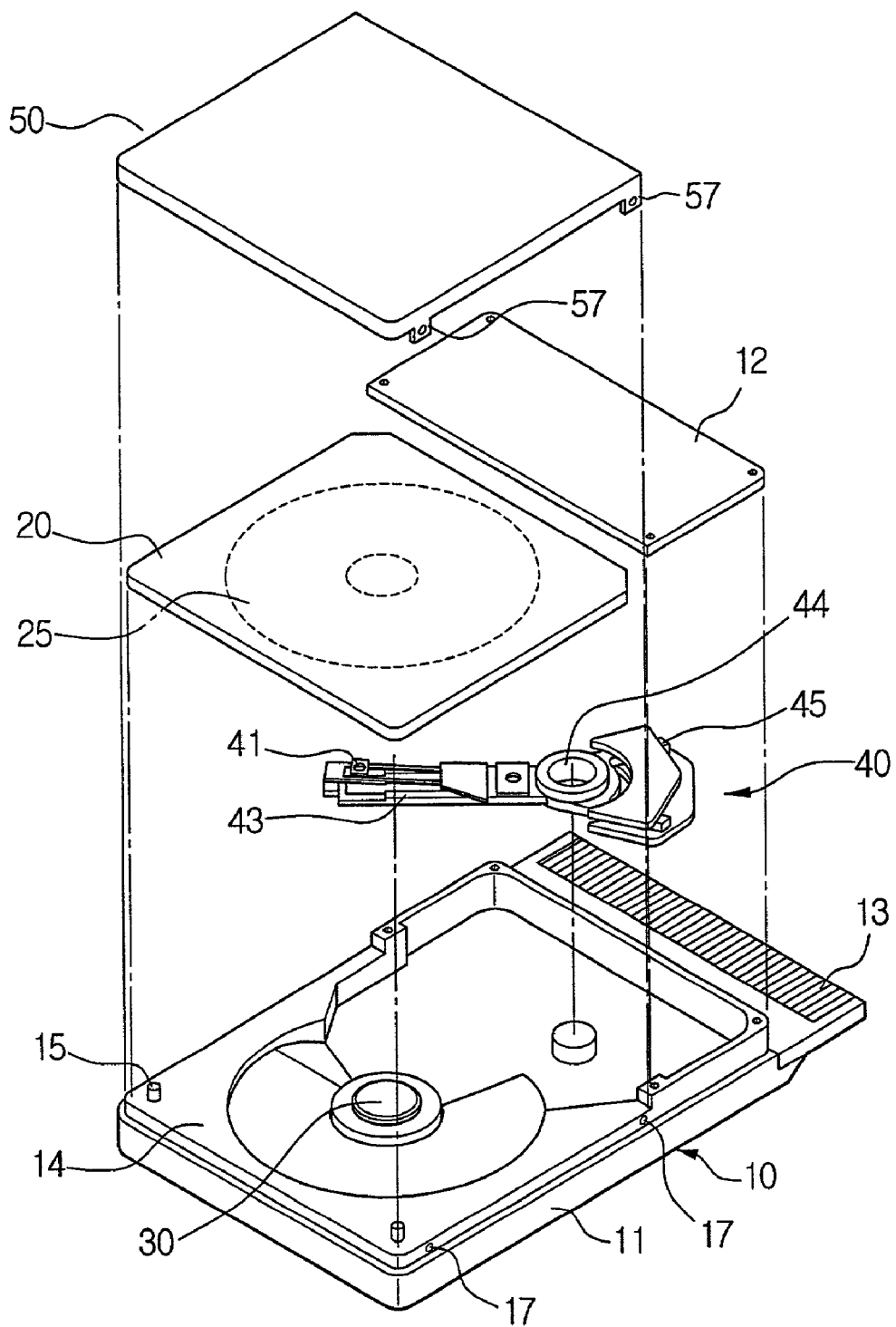
FIG. 1 is an exploded perspective view showing a recording apparatus according to a an embodiment of the present invention having a removable protection cover and a replaceable disk cartridge.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
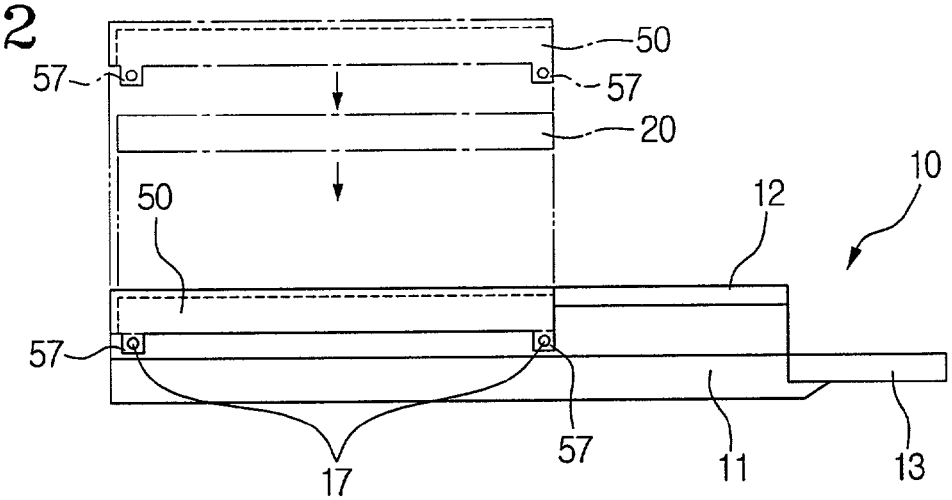
FIG. 2 is a side view showing the recording apparatus according to an embodiment of the present invention of FIG. 1.

Referring to FIGS. 1 and 2, a recording apparatus according to an embodiment of the present invention has a protection cover 50 that is removably disposed on a housing 10. The housing 10 comprises a housing body 11 and an upper cover 12. On top of the housing body 11, a seating section 14 is formed to hold a disc cartridge 20. The protection cover 50 is disposed on top of the seating section 14. Specifically, the housing body 11 has a bottom and a sidewall and is constructed in a manner such that the upper cover 12 partially covers the top the housing body 11 and the seating section 14 is formed on the uncovered top of the housing body 11.

Also, there is a connector 13 disposed at one end of the housing body 11. The connector 13 may be inserted into a PCMCIA port to be connected to a product such as a computer. For example, when the housing 10 is inserted into the PCMCIA port of the computer (not shown), the connector 13 is connected to a corresponding connector in the PCMCIA port (not shown) such that the connector 13 transmits and receives various electric signals with the connector in the PCMCIA port. It is understood that other types of signals, such as optical signals, could also be used. Further, it is understood that the PCMCIA port generally refers to a port compliant with PCMCIA cards, PC Cards, Cardbus, Miniature card, CardBay, and other similar devices and standards.

Figure 3B:
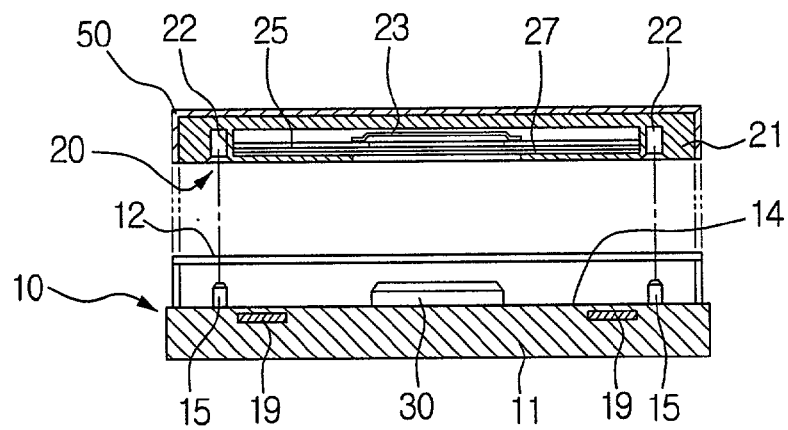
FIG. 3B is a front view showing the recording apparatus according to an embodiment of the present invention, which prevents the disk cartridge from moving and being removed by a magnet disposed in a housing body and has cylindrical protrusions to determine a seating position of the disk cartridge.
Figure 4:
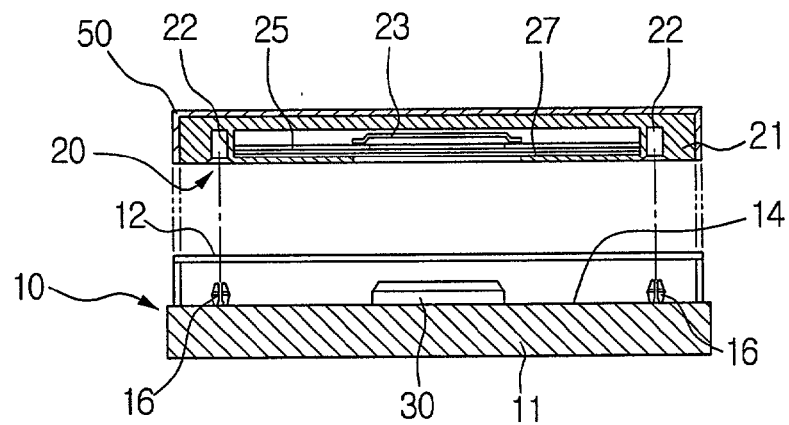
FIG. 4 is a front view showing the recording apparatus according to an embodiment of the present invention, which prevents the disk cartridge from moving and being removed by an elastic protrusion formed on a seating section of the housing body.
Figure 3A:
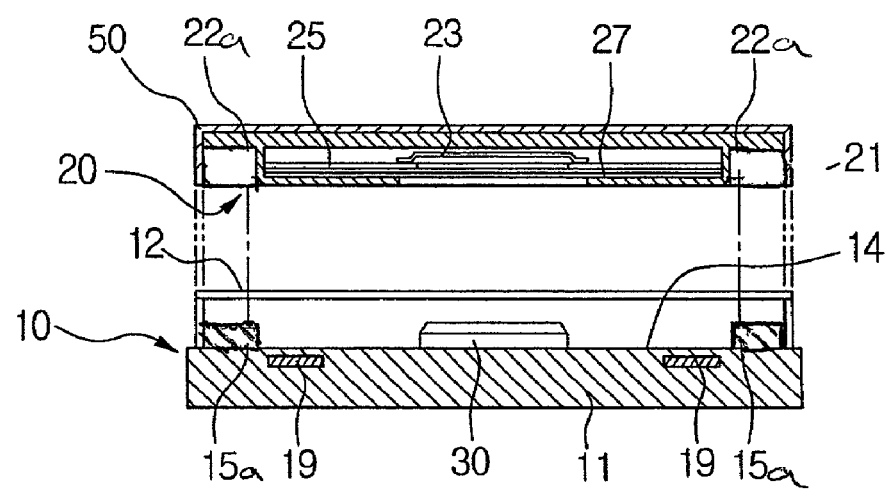
FIG. 3A is a front view showing the recording apparatus according to an embodiment of the present invention, which prevents the disk cartridge from moving and being removed by a magnet disposed in a housing body and has steps to determine a seating position of the disk cartridge.

Referring to FIGS. 3A, 3B, and 4, the disk cartridge 20 rotatably holds a disk-type recording medium 25 therein. The disk cartridge 20 has an opening formed at a bottom thereof to expose the disk-type recording medium 25. There is a shutter 27 disposed between the opening and the disk-type recording medium 25. The shutter 27 is turned in a circumferential direction about a rotational axis of the disk-type recording medium 25. Accordingly, when the disk cartridge 20 is mounted in the housing 10, the shutter 27 is opened by a switching device (not shown) so that the disk-type recording medium 25 is in contact with a head 41.

At a center of the seating section 14, a disk driving section 30 is disposed to rotatably drive the disk-type recording medium 25 in the disk cartridge 20.

Also, at a center of the disk-type recording medium 25 in the disk cartridge 20, a disk clamp 23 is disposed. The disk driving section 30 includes a rotor and a stator (not shown), and also a magnet (not shown) disposed on a surface on which the disk clamp 23 is placed. Accordingly, if the disk cartridge 20 is mounted on the disk driving section 30 on the housing 10, the disk clamp 23 is magnetically attracted to the disk driving section 30 by a magnetic force, and then the disk-type recording medium 25 rotates as the disk driving section 30 rotates.

A recording/reproducing unit 40 has a head 41, a head arm 43 having a pivot hole 44, and a voice coil 45. The head 41 may be an optical head or a magnetic head, depending on the type of the disk-type recording medium 25. The head 41 in the shown embodiment of the present invention is an optical head. The optical head 41 is disposed on one end of the head arm 43. The voice coil 45 is disposed on the opposite end of the head arm 43 and includes a voice coil motor with a magnet (not shown). The pivot hole 44 is formed at a center of the head arm 43 such that the head arm 43 rotates about the pivot hole 44.

If the disk cartridge 20 is mounted in the housing 10, the disk-type recording medium 25 in the disk cartridge 20 is rotatably mounted on the disk driving section 30. When the disk cartridge 20 is mounted on or removed from the housing 10, the recording/reproducing unit 40 recedes to a position so as not to interfere with the disk cartridge 20. If the disk cartridge 20 is completely mounted in the housing 10, the shutter 27 is opened and the recording/reproducing unit 40 is loaded toward the disk-type recording medium 25.

When the disk cartridge 20 is mounted in the housing 10, the protection cover 50 is positioned at the seating section 14 to protect the disk cartridge 20, and when the disk cartridge 20 is not mounted in the housing 10, the protection cover 50 is positioned above the seating section 14 to protect a component in the housing 10 and to prevent dust from entering. The protection cover 50 may include a buffering element (not shown), such as a sponge, therein depending on the circumstances.

Here, the recording apparatus further includes a removal preventing mechanism to prevent the protection cover 50 from being removed from the housing 10 when the disk cartridge 20 is mounted on the housing 10. The removal preventing mechanism has elastic pieces 57 formed at each lower sidewall of the protection cover 50, and corresponding protrusions 17 formed at the housing body 11. When the protection cover 50 is closed, the protrusions 17 are secured to the elastic pieces 57 by snap-fastening so that the protection cover 50 is not removed from the housing 10.

However, although it is described that the elastic pieces 57 are formed at the protection cover 50 and the protrusions 17 are formed at the housing 10, it is understood that there may be like variations in construction in which the protrusions 17 are formed at the protection cover 50 and the elastic pieces 57 are formed at the housing 10 or combinations thereof. Also, although the two elastic pieces 57 are disclosed as being disposed at each side of the protection cover 50, the elastic pieces 51 may also be disposed at a front and/or a rear of the protection cover 50, at the front and the rear and the sides of the protection cover 50, or any combination thereof.

The seating section 14 also includes a position determining mechanism to determine a seating position of the disk cartridge 20. Referring to the embodiment of the present invention shown in FIG. 3B, the position determining mechanism includes cylindrical protrusions 15 disposed at front side-corners of the seating section 14, and corresponding holes 22 formed in a case 21 of the disk cartridge 20. That is, as the plurality of cylindrical protrusions 15 are inserted into the holes 22, the seating position of disk cartridge 20 is determined. However, it is understood that the protrusions need not be cylindrical in all aspects of the invention, and can be any prismatic or tapered shape.

The seating section 14 further includes a movement preventing mechanism to prevent the disk cartridge 20 from moving or being removed from the seating section 14. The movement preventing mechanism may comprise a plurality of magnets 19 disposed at the seating section 14. In this case, the case 21 of the disk cartridge 20 is made of metal or has a plurality of magnets (not shown) therein corresponding to the magnets 19 such that the disk cartridge 20 is securely seated on the seating section 14 by a magnetic force. However, it is understood that the seating section 14 need not contain both the position determining mechanism and the movement preventing mechanism in all aspects of the invention.

As shown in FIG. 4, on front side-corners of the seating section 14, a plurality of elastic protrusions 16 are disposed and simultaneously perform two functions. The first function is to determine the seating position of the disk cartridge 20, and the second function is to snap-fasten the case 21 and the disk cartridge 20 together. In this case, the case 21 has holes 22 corresponding to the elastic protrusions 16. Accordingly, when the plurality of elastic protrusions 16 is inserted into the holes 22, the seating position of the disk cartridge 20 is determined, and at the same time, the disk cartridge 20 is connected to the housing 10 by the snap-fastening of the elastic protrusions 16 into the holes 22.

It is understood that while it is described that the disk cartridge 20 is connected to the housing 10 by the snap-fastening of the plurality of elastic protrusions 16 into the holes 22, the protrusions or holes may be formed on sidewalls of the seating section 14 and a corner of an undersurface of the disk cartridge 20 such that the disk cartridge 20 is connected to the housing 10 by the snap-fastening. In addition, although the elastic protrusions 16 are formed on the housing 10 and the holes 22 are formed on the disk cartridge 20, there may be another construction in which the holes 22 are formed on the housing 10 and the elastic protrusions 16 are formed on the disk cartridge 20. Also, although the two elastic protrusions 16 are formed on the seating section 14 of the housing 10, the number and positions of the elastic protrusions 16 can be properly determined as required.

Also, instead of using the cylindrical protrusions 15 to determine the seating position of the disk cartridge 20 as shown in FIG. 3B, the seating section 14 may comprise a stepped portion 15a of a predetermined length that is received by channels 22a such that the seating position of the disk cartridge 20 is determined by the contact of the stepped portion 15a with the channels 22a of the disk cartridge 20 as shown in the embodiment of the present invention shown in FIG. 3A.

According to the embodiment of the present invention shown in FIGS. 1 through 4, in order for the disk cartridge 20 to be mounted, the protection cover 50 is opened, the disk cartridge 20 is seated on the seating section 14, and then the protection cover 50 is closed.

Figure 5:
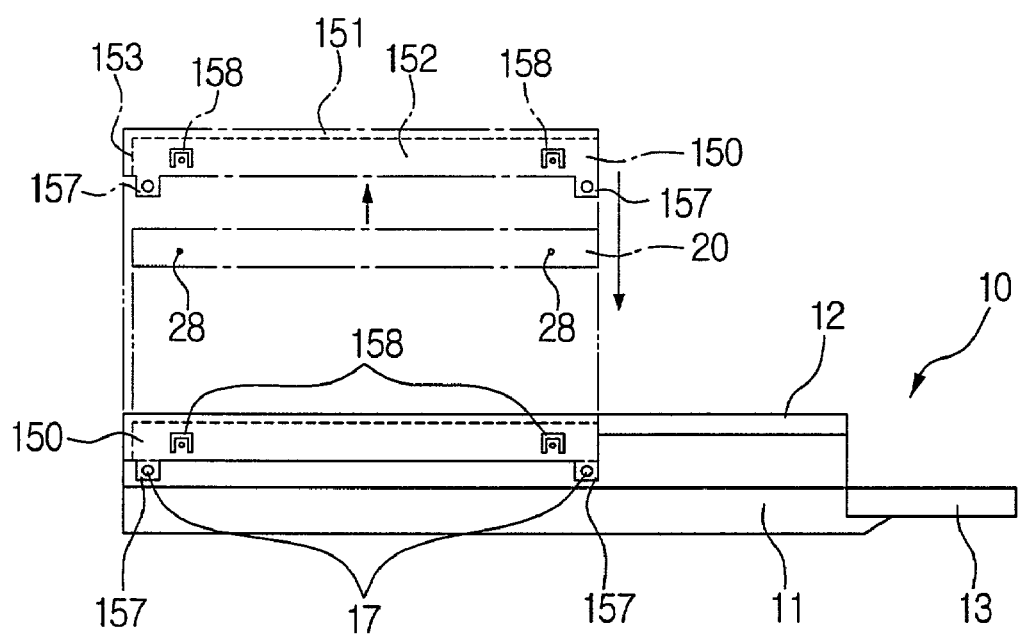
FIG. 5 is a side view showing a recording apparatus according to an embodiment of the present invention, wherein an elastic piece is formed on a protection cover in a vertical direction.

FIG. 5 is a side view showing a recording apparatus according to another embodiment of the present invention. As shown in FIG. 5, elastic pieces 158 are formed on a protection cover 150 to receive the disk cartridge 20 in a vertical direction. The disk cartridge 20 is seated on a seating section 14 in a manner such that, when the protection cover 150 is opened, the disk cartridge 20 is held in the opened protection cover 150, and then the protection cover 150 holding the disk cartridge 20 is connected to a housing 10. The protection cover 150 includes an upper plate 151 formed opposite to the disk cartridge 20, sidewalls 152, and a front wall 153 which extend downward from the upper plate 151. Accordingly, the disk cartridge 20 is inserted in a substantially vertical direction through an opened lower portion of the protection cover 150 to be held therein.

Like the embodiment shown in FIG. 1, the protection cover 150 is connected to the housing 10 by snap-fastening using the protrusions 17 and elastic pieces 157. The protection cover 150 is connected to the disk cartridge 20 by the snap-fastening of protrusions 28 into the elastic pieces 158. The elastic pieces 158 are in vertical relation to the upper plate 151 such that the disk cartridge 20 is inserted in a substantially vertical direction.

Figure 6:
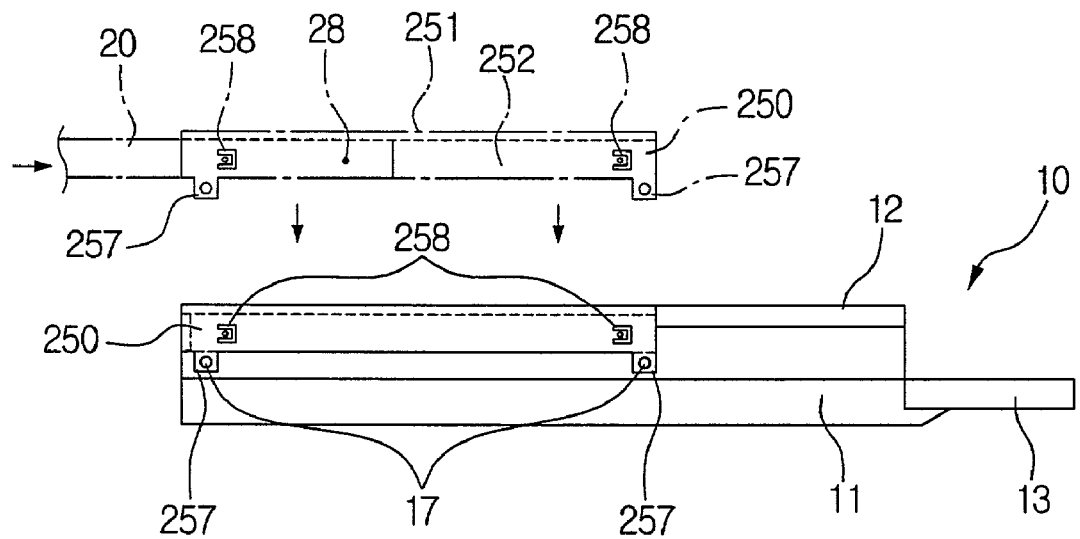
FIG. 6 is a side view showing a recording apparatus according to an embodiment of the present invention, wherein an elastic piece is formed on a protection cover in a horizontal direction.

FIG. 6 is a side view showing a recording apparatus according to another embodiment of the present invention. As shown in FIG. 6, a protection cover 250 has elastic pieces 258 formed to receive the disk cartridge 20 in a horizontal direction. Like the embodiment shown in FIG. 5, the protection cover 250 includes an upper plate 251 formed opposite to a disk cartridge 20, and sidewalls 252 extended downwardly from the upper plate 251. However, there is no front wall or else the front wall 153 shown in FIG. 5 is formed as an opening/closing portion that opens and closes to allow access inside the protection cover 250. Thus, the disk cartridge 20 is inserted in a substantially horizontal direction through an opened front wall of the protection cover 250.

According to the above construction, the disk cartridge 20 is mounted on a seating section 14 in a manner that, when the protection cover 250 is opened, the disk cartridge 20 is mounted in the opened protection cover 250 by insertion as indicated by the arrow, and then the protection cover 250 holding the disk cartridge 20 is connected to a housing 10. Like the embodiment of the present invention shown in FIGS. 1 to 4, the protection cover 250 is connected to the housing 10 by snap-fastening using protrusions 17 fastened into elastic pieces 257. Like the embodiment of the present invention shown in FIG. 5, the protection cover 250 is connected to the disk cartridge 20 by the snap-fastening of protrusions 28 into the elastic pieces 258. The elastic pieces 258 are in a horizontal relation to the upper plate 251 such that the disk cartridge 20 is inserted in a substantially horizontal direction.

While not shown, it is understood that, although the elastic pieces 157 and 257 are formed on the protection covers 150 and 250 and the protrusions 28 are formed on the disk cartridge 20, the protrusions 28 may also be formed on the protection covers 150 and 250 and the elastic pieces 157 and 257 may be formed on the disk cartridge 20 or any combination thereof. Also, although the two elastic pieces 157 and 257 are formed on each side 152 and 252 of the protection covers 150 and 250, the elastic pieces 157 and 257 may be formed on a front and/or a rear of the protection covers 150 and 250, or the front or rear and the sides 152 and 252 of the protection covers 150 and 250 or any combination thereof.

Figure 7:
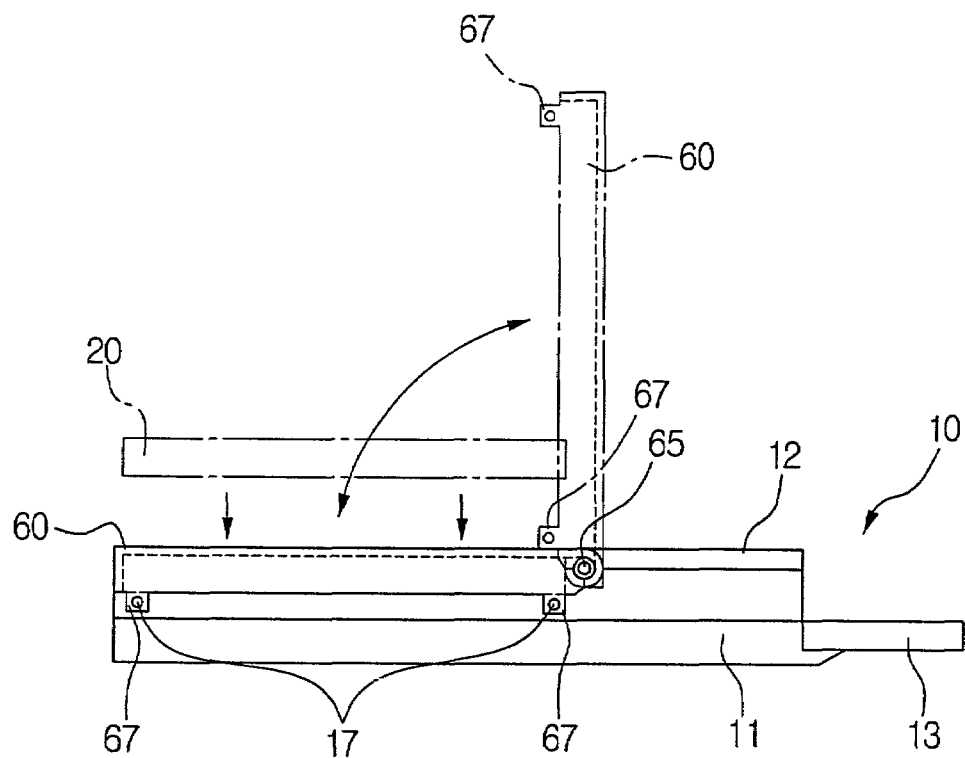
FIG. 7 is a side view showing a recording apparatus according to an embodiment of the present invention, which comprises a pivotable protection cover to permit replacement of a disk cartridge.

FIG. 7 is a side view showing a recording apparatus according to another embodiment of the present invention. As shown in FIG. 7, a protection cover 60 is rotatably attached to the housing 10 to allow replacement of the disk cartridge 20. The protection cover 60 turns on a hinge 65 to be opened and closed relative to the housing 10. In addition to the hinge 65, the protection cover 60 is connected to the housing 10 by fitting protrusions 17 into the elastic pieces 67. Although the two elastic pieces 67 are shown as formed on each side of the protection cover 60, it is understood that the elastic pieces 67 may also be formed on a front or the front and both sides of the protection cover 60, or any combination thereof.

Since the disk cartridge 20 is mounted in the same manner as that of the embodiment shown in FIGS. 1 to 4, a detail description thereof is omitted.

Figure 8:
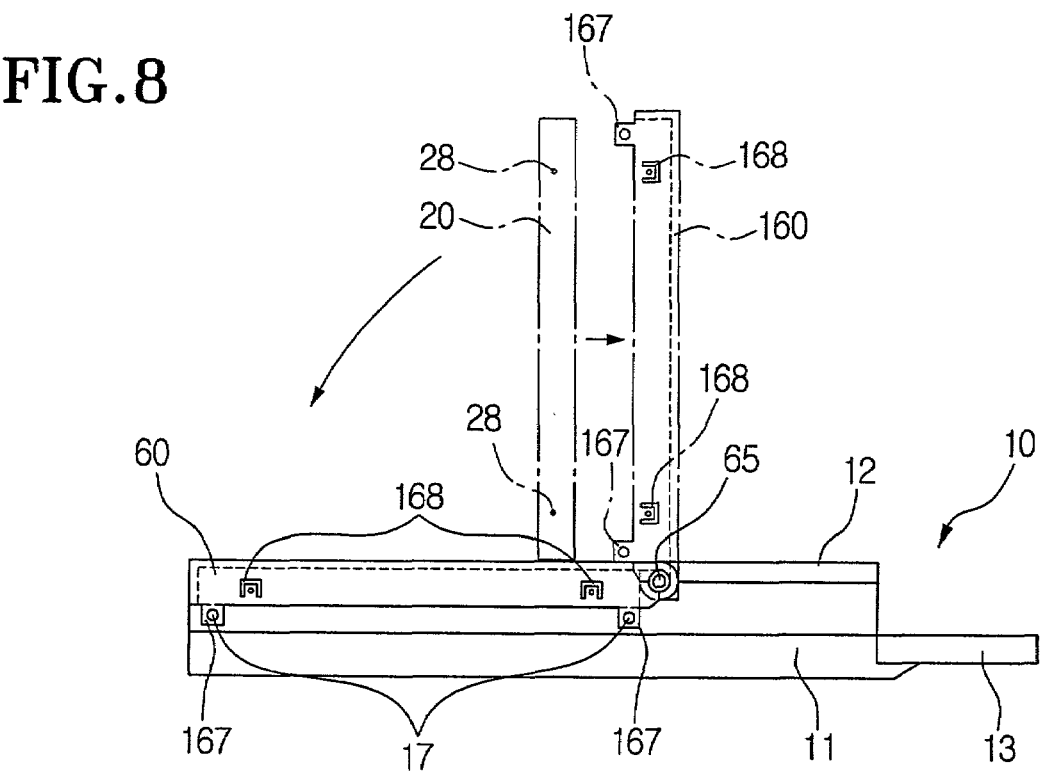
FIG. 8 is a side view showing a recording apparatus according to an embodiment of the present invention, wherein an elastic piece is formed on a protection cover in a vertical direction.

FIG. 8 is a side view showing a recording apparatus according to another embodiment of the present invention. As shown in FIG. 8, a protection cover 160 has elastic pieces 168 formed to allow insertion of the disk cartridge 20 in a vertical direction. Like the embodiment shown in FIG. 5, the disk cartridge 20 is mounted on the protection cover 160 in a manner that, when the protection cover 160 is opened, the disk cartridge 20 is inserted into the opened protection cover 160 in a substantially vertical direction. Then, the protection cover 160 is connected to the disk cartridge 20 by snap-fastening the protrusions 28 into the elastic pieces 168.

Figure 9:
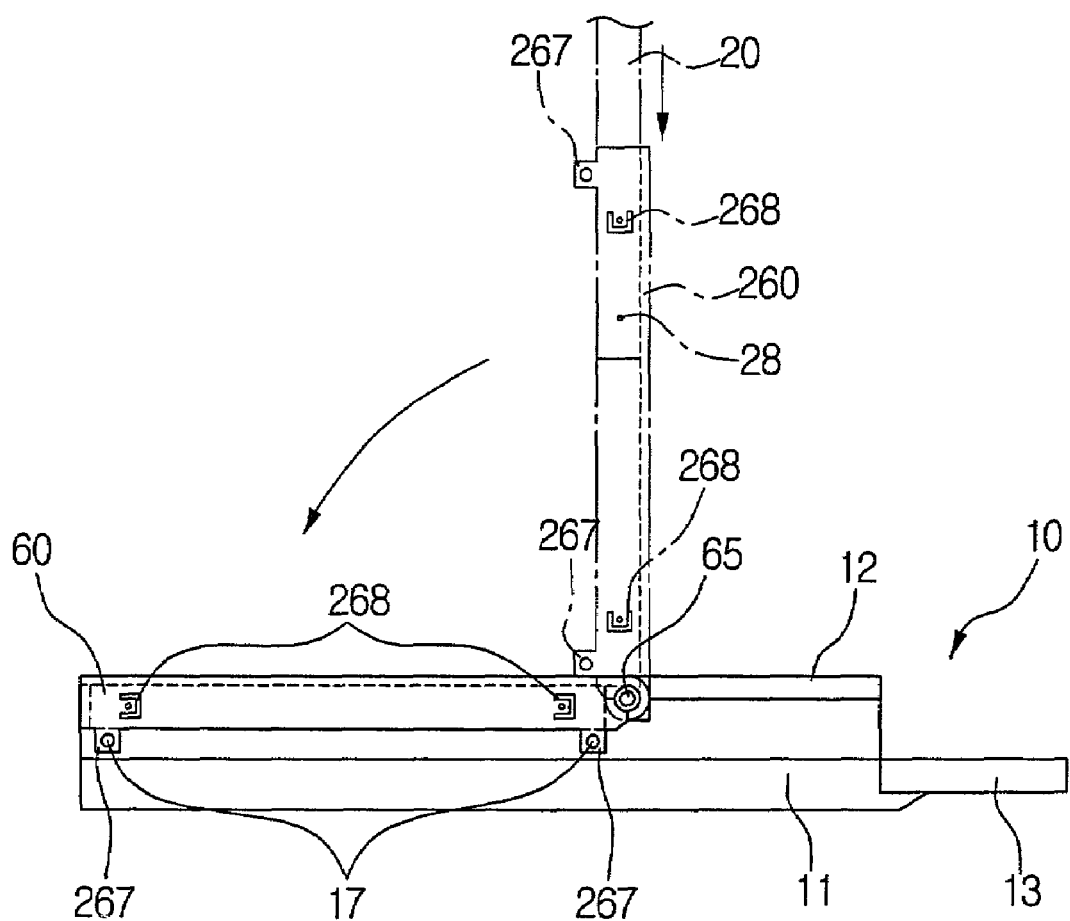
FIG. 9 is a side view showing a recording apparatus according to an embodiment of the present invention, wherein an elastic piece is formed on a protection cover in a horizontal direction.

FIG. 9 is a side view showing a recording apparatus according to another embodiment of the present invention. As shown in FIG. 9, a protection cover 260 comprises elastic pieces 268 formed to receive the disk cartridge 20 in a horizontal direction. Like the embodiment shown in FIG. 6, the disk cartridge 20 is mounted on the protection cover 260 in manner that, when the protection cover 260 is opened, the disk cartridge 20 is inserted into the opened protection cover 260 in a substantially horizontal direction. Then, the protection cover 260 is connected to the disk cartridge 20 by snap-fastening the protrusions 28 into the elastic pieces 268.

Although the protection cover 160 of FIG. 8 has three (3) surfaces (i.e. a front wall and both sidewalls), the protection cover 260 of FIG. 9 need not have the front wall so as to not interfere with the disk cartridge 20 when being mounted, or else it may have an opening/closing portion to open and close to allow the disk cartridge 20 to be mounted in the protection cover 260.

According to the embodiments shown in FIGS. 7 through 9, although the protection covers 60, 160, 260 rotate to be opened and closed by a user, the protection covers 60, 160, and 260 may also be opened by elastic power of an elastic element, or a combination thereof.

In addition, while not shown, it is understood that the protective cover 50 and the disk cartridge 20 could be sold as an integrated cover such that the recording medium is held by the integrated cover without requiring a separate disk cartridge 20.

Figure 10:
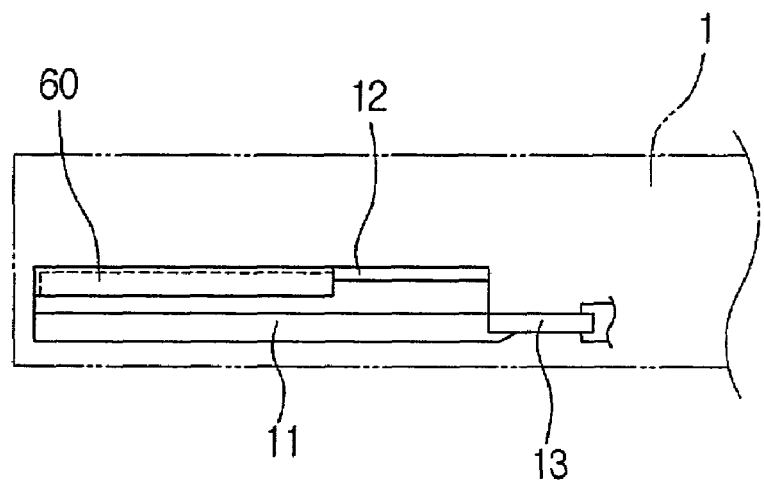
FIG. 10 is a side view showing the recording apparatus according to an embodiment of the present invention being mounted on an inner portion of a product.

FIG. 10 is a side view showing a recording apparatus according to an embodiment of the present invention, where the recording apparatus is mounted in a product 1. Since the disk cartridge 20 is mounted in the product 1, the recording apparatus can be protected from shock or contamination.

Figure 11:
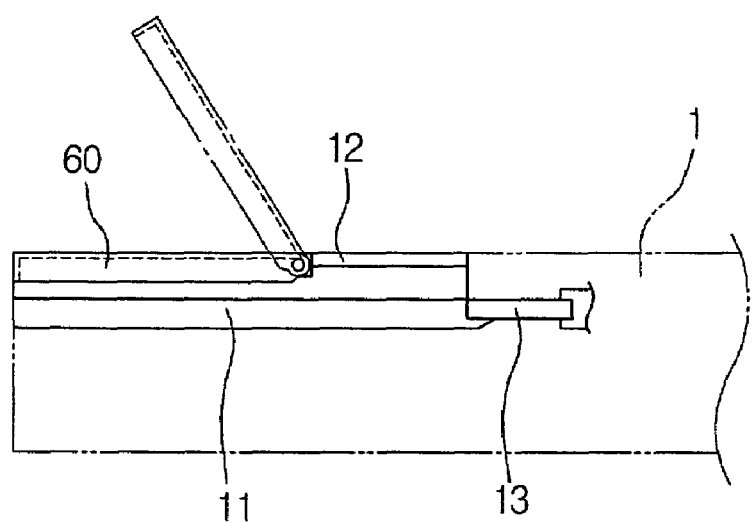
FIG. 11 is a side view showing the recording apparatus according to an embodiment of the present invention being mounted on an upper portion of a product.

FIG. 11 is a side view showing a recording apparatus according to an embodiment of the present invention, where the recording apparatus is mounted on an upper portion of the product 1 (i.e. exposed externally). In this case, the disk cartridge 20 can be replaced without requiring the recording apparatus to be removed from the product 1. Also, although not shown, it is understood that the recording apparatus may be mounted on a lower portion or a side portion of the product 1. It is further understood that the recording apparatus could be mounted partially externally, or fully externally to the product 1.

As described above, according to the present invention, the recording apparatus is easily mounted in a portable product such as a laptop computer, camcorder, digital camera, and game machine. Also, the recording apparatus according to the present invention is a portable, PCMCIA card-type recording apparatus that allows replacement of a disk cartridge holding a disk when additional memory capacity is required, thereby reducing a replacement cost for the disk cartridge and allowing the convenience of the keeping and using the same.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording and/or reproducing apparatus for use with a disk cartridge having a recording medium, comprising:
    a housing having a seating section on which the disk cartridge is removably seated;
    a disk driving section disposed in said housing to rotatably drive the recording medium when the disk cartridge is seated on the seating section;
    a recording/reproducing unit disposed in said housing to record and/or reproduce data with respect to the recording medium; and
    a protection cover, removably disposed at said housing, to cover the disk cartridge and to allow the disk cartridge to be removed from the recording apparatus, wherein the removability of the protection cover from the housing is independent from that of the disk cartridge.

2. The recording and/or reproducing apparatus of claim 1, wherein said protection cover is pivotably disposed at said housing.

3. The recording and/or reproducing apparatus of claim 1, further comprising a removal preventing mechanism that prevents said protection cover from being removed from said housing when said protection cover is connected to said housing to cover the disk cartridge.

4. The recording and/or reproducing apparatus of claim 3, wherein said removal preventing mechanism comprises: elastic pieces formed on one of said protection cover and said housing; and snap protrusions corresponding to the elastic pieces, the snap protrusions being formed on the other one of said protection cover and said housing.

5. The recording and/or reproducing apparatus of claim 4, wherein the elastic pieces are formed by being cut in a direction according to a relative connection direction of the disk cartridge when mounted in said protection cover.

6. The recording and/or reproducing apparatus of claim 5, wherein the elastic pieces are formed by being cut in a horizontal direction and relative connection direction of the disk cartridge is horizontal.

7. The recording and/or reproducing apparatus of claim 5, wherein the elastic pieces are formed by being cut in a vertical direction and a relative connection direction of the disk cartridge is vertical.

8. The recording and/or reproducing apparatus of claim 1, further comprising a movement preventing mechanism that prevents the disk cartridge seated on the seating section from moving.

9. The recording and/or reproducing apparatus of claim 8, wherein said movement preventing mechanism comprises: elastic protrusions that protrude from the seating section and correspond to holes in the disk cartridge, where the elastic protrusions deform elastically when inserted into the corresponding holes.

10. The recording and/or reproducing apparatus of claim 8, wherein said movement preventing mechanism comprises: an elastic piece formed on a wall of said protection cover to be in contact with a corresponding protrusion on the disk cartridge elastically.

11. The recording and/or reproducing apparatus of claim 8, wherein said movement preventing mechanism comprises a magnet disposed on a bottom of the seating section to be connected to a case of the disk cartridge by a magnetic force, the case being made of metal.

12. The recording and/or reproducing apparatus of claim 1, further comprising a position determining mechanism that determines a position of the seating section on which the disk cartridge is seated.

13. The recording and/or reproducing apparatus of claim 12, wherein said position determining mechanism comprises:
    a protrusion that protrudes from the seating section of said housing, where the protrusion corresponds to a hole formed on the disk cartridge.

14. The recording and/or reproducing apparatus of claim 12, wherein said position determining mechanism comprises a stepped portion formed at the seating section of said housing, where the stepped portion is in contact with an edge of the disk cartridge such that the seating position of the disk cartridge is determined.

15. The recording and/or reproducing apparatus of claim 1, wherein said protection cover is positioned to protect the disk cartridge when said protection cover is seated on the seating section.

16. The recording and/or reproducing apparatus of claim 1, further comprising a connector through which the data is transmitted or received to a device external to said housing.

17. The recording and/or reproducing apparatus of claim 1, wherein the recording and/or reproducing apparatus is a PCMCIA compliant card.

18. The recording and/or reproducing apparatus of claim 1, wherein the protection cover is moveable relative to said housing to cover and protect the disk cartridge when closed, and to allow the disk cartridge to remain seated on the seating section to be removed from the recording apparatus when opened to uncover the disk cartridge.

19. The recording and/or reproducing apparatus of claim 18, wherein the protection cover includes elements that fasten to said housing to cover and protect the disk cartridge when closed, and are unfastened when opened to uncover the disk cartridge.

20. The recording and/or reproducing apparatus of claim 18, wherein the protection cover is snap fastened to said housing to cover and protect the disk cartridge when closed, and unsnapped to allow the disk cartridge to remain seated on the seating section to be removed from the recording apparatus when opened to uncover the disk cartridge.

21. A recording and/or reproducing apparatus for use with a recording medium, comprising:
    a housing to receive the recording medium and from which the recording medium is removable;
    a disk driving section disposed in said housing to rotatably drive the recording medium when the recording medium is in said housing;
    a recording and/or reproducing unit disposed in said housing to record and/or reproduce data with respect to the recording medium;
    a PCMCIA compliant port through which the data is transmitted or received to or received from a device external to said housing; and
    a cover to protect the recording medium when seated on the housing and which is removable from the housing to allow the recording medium to remain seated on the housing.

22. The recording and/or reproducing apparatus of claim 21, wherein said cover and said housing have interlocking elements that connect said cover and said housing.

23. The recording and/or reproducing apparatus of claim 21, wherein said housing and said cover have interconnecting elements that place the recording medium in a predetermined position to be accessed by said recording and/or reproducing unit and said disk driving section.

24. The recording and/or reproducing apparatus of claim 23, wherein
the interconnecting elements of one of said housing and said cover comprise a protruding element, and
the interconnecting elements of another one of said housing and said cover comprise a recess to receive the protruding element.

25. The recording and/or reproducing apparatus of claim 23, wherein
the protruding element comprises a protrusion, and
the recess comprises a hole to receive the protrusion.

26. The recording and/or reproducing apparatus of claim 23, wherein
the protruding element comprises a stepped portion, and
the recess comprises a channel to receive the stepped portion.

27. The recording and/or reproducing apparatus of claim 21, wherein said cover comprises a protective cover that is positioned to protect a disk cartridge housing the recording medium.

28. A recording and/or reproducing apparatus for use with a disk cartridge having a recording medium, comprising:
a housing having a seating section on which the disk cartridge is seated;
a disk driving section disposed in the housing to rotatably drive the recording medium when the disk cartridge is seated on the seating section;
a recording/reproducing unit disposed in the housing to record and/or reproduce data with respect to the recording medium; and
a cover having elements that fasten to the housing independent of the disk cartridge such that the cover protects the disk cartridge when the disk cartridge is seated in the housing, and, such that, when the cover is removed from the housing as a result of the elements being unfastened from the housing so as to leave the disk cartridge seated in the housing, the cover does not cover the disk cartridge.

29. A recording and/or reproducing apparatus for use with a recording medium held within a cartridge, comprising:
a housing to receive the recording medium and from which the recording medium is removable, in which a seating section on which the recording medium sits is formed;
a disk driving section disposed in said housing to rotatably drive the recording medium when the recording medium is in said housing;
a recording and/or reproducing unit disposed in said housing to record and/or reproduce data with respect to the recording medium; and
a removable cover that is detachably fastened to the housing, which is attachable to the housing independent of the cartridge, wherein when the removable cover is attached to the housing, the cartridge is positioned by the seating section of the housing such that the recording medium is rotatably driven by said disk driving section and protected by the removable cover, and when the removable cover is not attached to the housing, the cartridge remains in the housing.

30. A recording and/or reproducing apparatus for use with a recording medium held by a disk cartridge, comprising:
a housing to receive the disk cartridge and the recording medium and from which the disk cartridge and the recording medium are removable;
a disk driving section disposed in said housing to rotatably drive the recording medium when the recording medium is in said housing;
a recording and/or reproducing unit disposed in said housing to record and/or reproduce data with respect to the recording medium; and
a cover that is removably disposed at the housing to cover the disk cartridge when the disk cartridge is seated in the housing, and, when the cover is removed, to uncover the recording medium with the disk cartridge left to remain seated on the housing,
wherein the recording and/or reproducing unit is PCMCIA compliant.

31. The recording and/or reproducing apparatus of claim 30, wherein the removable cover protects the recording medium when the disk cartridge is seated in said housing, and protects components of said housing when the disk cartridge and the recording medium are not in said housing.

32. A recording and/or reproducing apparatus for use with a recording medium held within a cartridge, comprising:
a housing to receive the cartridge and from which the cartridge is removable;
a disk driving section disposed in said housing to rotatably drive the recording medium when the recording medium is in said housing;
a recording and/or reproducing unit disposed in said housing to record and/or reproduce data with respect to the recording medium; and
a removable cover that snap-fastens to the cartridge, the cartridge being independently received by the housing, and positions the cartridge such that the recording medium is rotatably driven by said disk driving section,
wherein the recording and/or reproducing unit is PCMCIA compliant.

33. The recording and/or reproducing apparatus of claim 32, wherein
said cover further comprises one of elastic pieces and snap protrusions,
the cartridge comprises another of the elastic pieces and snap protrusions, and
said cover snap-fastens to the cartridge using corresponding pairs of the elastic pieces and the snap protrusions.

34. The recording and/or reproducing apparatus of claim 32, wherein said cover has a top and side walls attached to the top, and said cover receives the cartridge through a gap in the side walls.

35. A recording and/or reproducing apparatus for use with a recording medium, comprising:
a housing to receive the recording medium and from which the recording medium is removable;
a disk driving section disposed in said housing to rotatably drive the recording medium when the recording medium is in said housing;
a recording and/or reproducing unit disposed in said housing to record and/or reproduce data with respect to the recording medium; and
a removable cover that protects the recording medium when in said housing, and protects components of said housing when the recording medium is not in said housing, wherein:
the recording and/or reproducing unit is PCMCIA compliant,
the recording medium is held within a cartridge, such that the removability of the recording medium from the housing is independent from that of the cover, and
said cover snap-fastens to the cartridge and positions the cartridge such that the recording medium is rotatably driven by said disk driving section.

36. The recording and/or reproducing apparatus of claim 35, wherein said cover is rotatably attached to said housing.

37. The recording and/or reproducing apparatus of claim 35, wherein said cover is rotated using elastic power.

38. The recording and/or reproducing apparatus of claim 35, wherein the recording medium comprises a hard disk drive.

* * * * *